(No Model.)

J. A. HORTON.
FRICTION MOVEMENT.

No. 277,282. Patented May 8, 1883.

Witnesses:
Joseph Cutler
A. L. White

Inventor
James A. Horton
by Wright & Brown
Attys.

UNITED STATES PATENT OFFICE.

JAMES A. HORTON, OF READING, MASSACHUSETTS.

FRICTION-MOVEMENT.

SPECIFICATION forming part of Letters Patent No. 277,282, dated May 8, 1883.

Application filed October 19, 1882. (No model.)

*To all whom it may concern:*

Be it known that I, JAMES A. HORTON, of Reading, in the county of Middlesex and State of Massachusetts, have invented certain Improvements in Friction-Movements, of which the following is a specification.

This invention has for its object to provide improved means for stopping and starting mechanism driven by a continuously-rotated shaft; and it consists, first, in the provision of automatic devices for connecting the shaft and the mechanism operated thereby, so that both will rotate together normally; and, secondly, in a device whereby an attendant is enabled to instantly render said automatic devices inoperative when it is desired to stop the mechanism, all of which I will now proceed to describe and claim.

Figure 1:
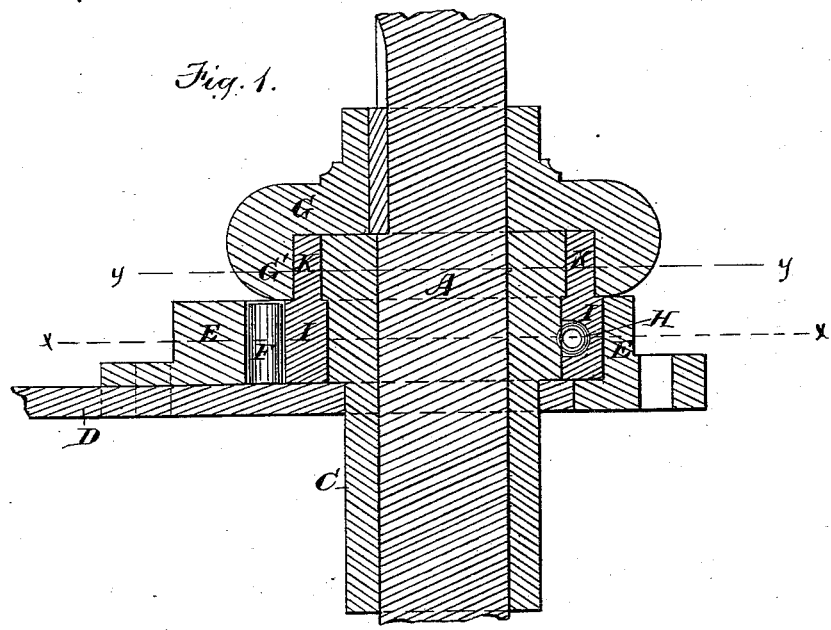
Figure 2:
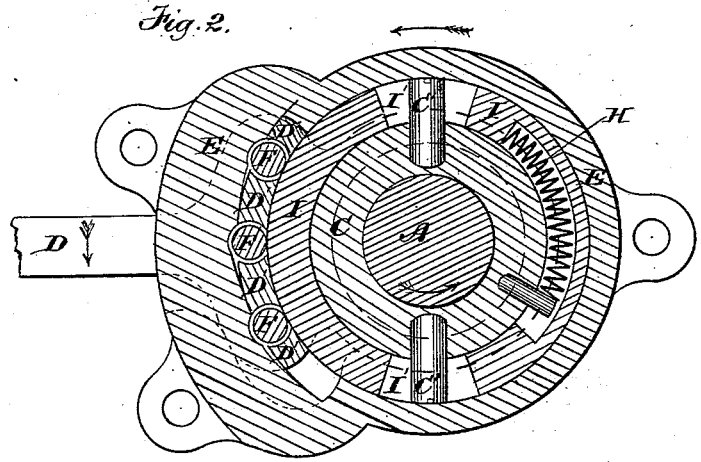
Figure 3:
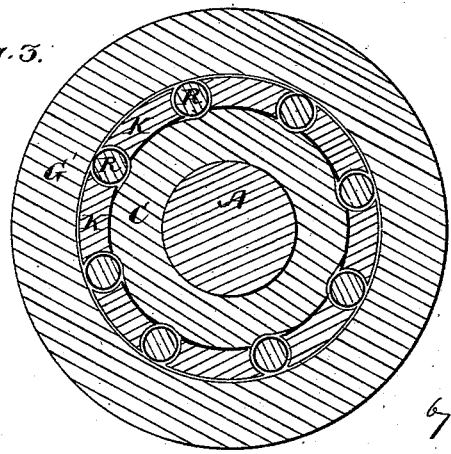

Of the accompanying drawings, forming a part of this specification, Figure 1 represents a longitudinal section of a friction-movement embodying my invention. Fig. 2 represents a section on line $x$ $x$, Fig. 1; and Fig. 3 represents a section on line $y$ $y$, Fig. 1.

The same letters of reference indicate the same parts in all the figures.

In the drawings, A represents the continuously-driven shaft, the same being, for example, the shaft of a hoisting-engine and attached to the balance-wheel and crank of said engine.

C represents a sleeve or collar which is loose upon the shaft, and is enlarged at one end, as shown in Fig. 1.

G represents a collar which is keyed rigidly to the shaft A, and is provided with a flange, G', which projects over the enlarged end of the sleeve C, and is larger than said sleeve, so that an annular space is formed between said sleeve and flange. The periphery of the sleeve C is indented at various points, as shown in Fig. 3, so as to form enlargements in the annular space above mentioned, and in these enlargements are placed a series of cylindrical rollers, R, of such diameter that when they are in the deeper portions of said indentations they will be in a loose condition between the flange G' and sleeve C; but when moved into the shallower portions of the indentations they will be firmly bound between the two surfaces and will cause both to rotate together.

I represents a ring which is placed loosely on the sleeve C, and which is adapted to rotate on said sleeve, its rotations being limited by studs C', projecting from the sleeve C into slots I' I' in the ring I.

On one end of the ring I are formed fingers or projections K, which project and nearly fill the spaces between the rollers R, so that when the ring I is rotated the projections K will press against and move the rollers R laterally.

H represents a spring placed in a recess in the ring I, and bearing against one end of said recess and against a stud, L, projecting from the sleeve C into said recess. The spring H operates to rotate the ring I in the direction indicated by the arrow in Fig. 2, and thus force the rollers R into the narrower parts of the enlargements of the annular space in which said rollers are located, and hold the rollers in said position, so that they will normally connect the flange G' and sleeve C and cause the shaft A, to which the flange G' is rigidly attached, to rotate the sleeve C, which may be provided with a pinion or otherwise adapted to impart motion from the shaft A to the mechanism to be operated.

E represents a casing rigidly attached to a suitable fixed frame or support and inclosing the ring I.

In one side of the casing E is a recess, E', which is provided with a series of indentations, in which are placed a series of rollers, F, which are of such diameter that when they coincide with the deeper portions of said indentations they are in a loose condition between the casing E and ring I, but when moved into the shallower portions of said indentations will bind the casing E and ring I firmly together, and thus arrest the motion of the ring I, (the casing E being fixed,) and cause the projections K of the latter to arrest the rollers R. Said rollers are thus caused to coincide with the deeper portions of the indentations in the sleeve C, and therefore cease to connect the sleeve C and flange G'. Each of the indentations in the casing E and sleeve C terminates abruptly at one end, as shown in Figs. 2 and 3, so that when the rolls are arrested they will be prevented by the abrupt terminations of the indentations from binding between the two surfaces.

It will be seen, therefore, that by arresting the ring I the shaft A and the sleeve C, which is connected with the mechanism to be operated, are disconnected and the mechanism becomes inoperative. To effect such disconnection I employ a lever, D, which is fitted to oscillate upon the shaft A, and has a series of projections, D', between which the rollers F are located, as shown in Fig. 2. Said projections move the rollers F laterally when the lever D is oscillated, and thus, when the lever is moved in the direction indicated by the arrow on said lever in Fig. 2, cause said rollers to bind between the casing E and ring I and arrest the motion of the ring. When the lever D is raised to the position shown in Fig. 2 the rollers F coincide with the deeper portions of the indentations in the casing E and are inoperative, the ring I being returned to its normal position by the spring H. The attendant is thus enabled by a single movement of the lever D to instantly stop or start the mechanism operated by the shaft.

The improved friction-movement is much quicker in its action and involves less wear and liability of breakage than any of which I am aware.

I claim—

1. The combination of a shaft having a recessed or flanged collar, a loose sleeve on said shaft adapted to communicate motion, and having an indented surface surrounded by said collar, a series of rollers located in the space between said sleeve and collar, and automatic means for holding said rollers with a yielding pressure in engagement with the surfaces of said sleeve and collar, as set forth.

2. The combination of a shaft having a recessed or flanged collar, a loose sleeve on said shaft adapted to communicate motion, and having an indented surface surrounded by said collar, a series of rollers located in the space between said sleeve and collar, an automatic device for holding said rollers with a yielding pressure in engagement with the surfaces of the sleeve and collar, and mechanism controlled by an attendant to arrest said automatic device, and thereby disconnect the sleeve from the shaft, as set forth.

3. The combination of a shaft having a recessed or flanged collar, a loose sleeve on said shaft adapted to communicate motion, and having an indented surface surrounded by said collar, a series of friction-rollers located in the space between said sleeve and collar, and a spring-impelled ring having projections interposed between said rollers and adapted to move the same laterally, as set forth.

4. The combination, with the spring-impelled ring, of the fixed and recessed casing E, the friction-rollers F, located in the recess of the casing, and the lever D, having projections adapted to move said rollers laterally, as set forth.

In testimony whereof I have signed my name to this specification, in the presence of two subscribing witnesses, this 10th day of October, 1882.

JAMES. A. HORTON.

Witnesses:
C. F. BROWN,
A. L. WHITE.